Feb. 25, 1947.                    A. CROSSLEY ET AL                    2,416,614
                                DETONATION INDICATING SYSTEM
                                    Filed Aug. 12, 1943
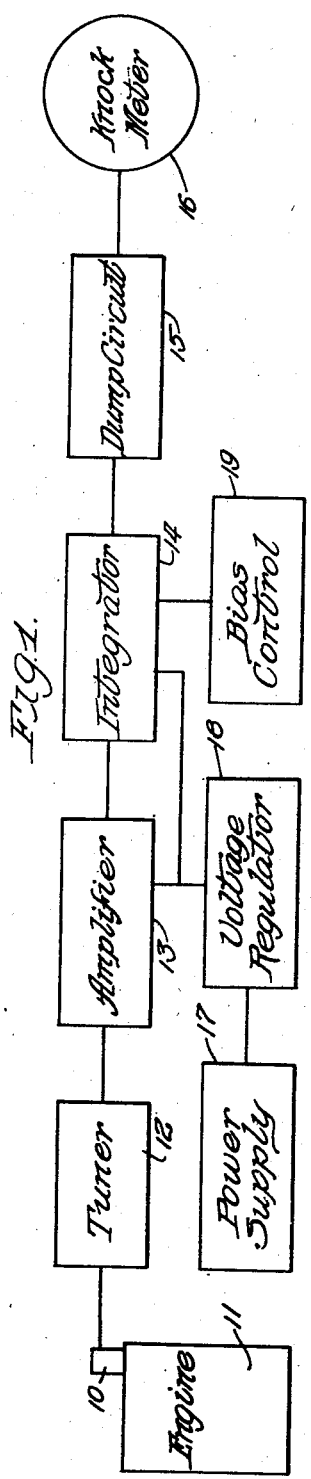
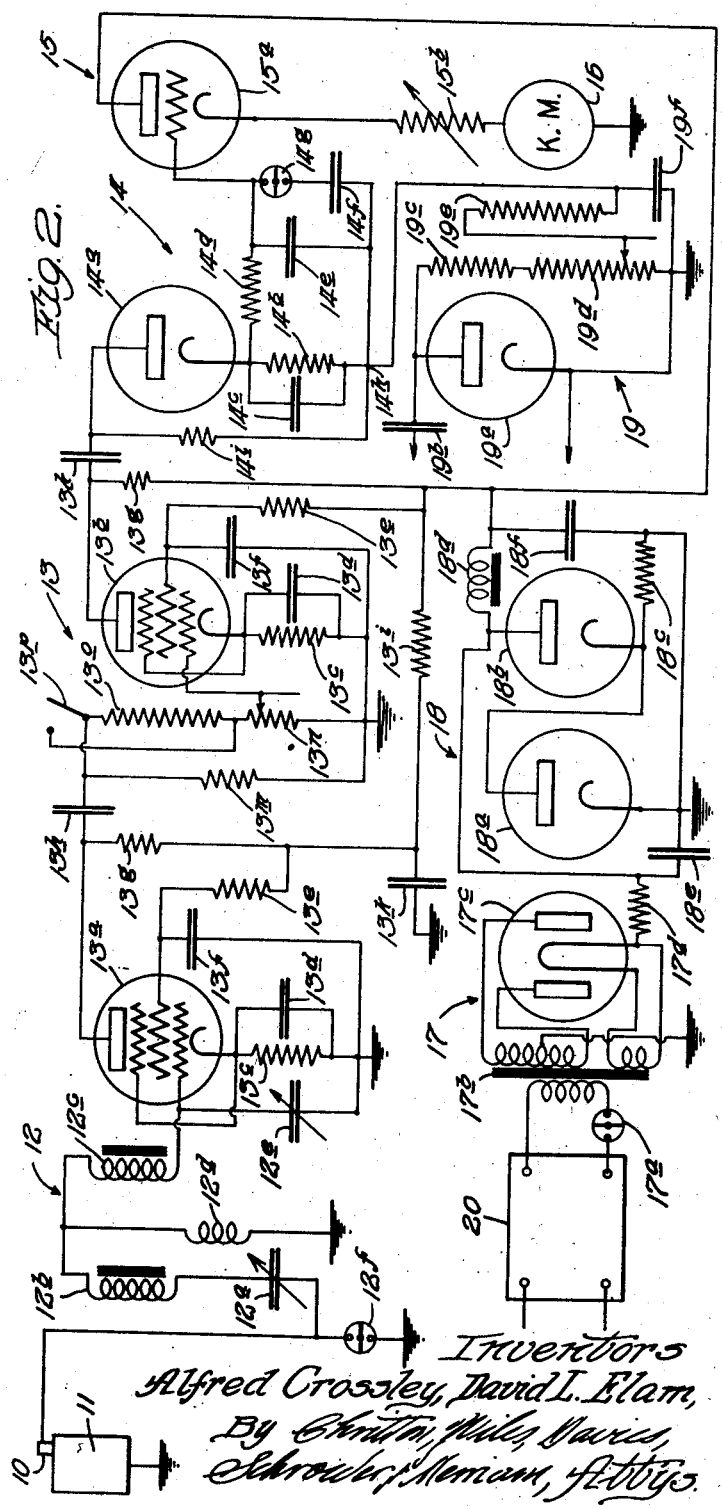
Inventors
Alfred Crossley, David L. Elam,
By their Attorneys Patented Feb. 25, 1947

2,416,614

UNITED STATES PATENT OFFICE 2,416,614

DETONATION INDICATING SYSTEM

Alfred Crossley, Evanston, and David L. Elam, Roselle, Ill.; said Elam assignor to said Crossley Application August 12, 1943, Serial No. 498,370

7 Claims. (Cl. 73—35)

This invention relates to a detonation indicating system, and more particularly to apparatus for indicating the average amplitude of a plurality of separate electrical impulses, as those created by translation into electrical impulses of the pressure variations in an internal combustion engine.

One feature of this invention is that it provides an improved means for securing a quick and convenient indication of the average amplitude of a plurality of separate electrical impulses; another feature of this invention is that it provides a new system for providing indications of certain phenomena in an internal combustion engine, as the pressure variations due to detonation or "knock" of the fuel; still another feature of this invention is that it provides improved means for eliminating the effects of undesired variations; yet another feature of this invention is the provision of improved means for providing an initial adjustment of the indicating device, and for expanding or contracting the variation of the indicating device for a given pressure variation being studied; and a further feature of this invention is that it provides an improved load and integrating circuit combination in association with a rectifier tube. Other features and advantages of this invention will be apparent from the following specification and the drawings, in which:

Figure 1 is a block diagram of one form of this invention; and Figure 2 is an operative circuit diagram of the device shown schematically in Figure 1.

There are a number of types of test work where it is desirable to provide an indication of the average amplitude of a plurality of separate electrical impulses. One example is in connection with the determination of average pressure generated in a pump or a cylinder of an internal combustion engine. In such a case a pick-up or translating device may be used to translate the pressure variations into corresponding electrical variations, then these electrical variations or impulses may be used to actuate the indicating system. Such a system is used, for example, in determining the detonation characteristics of fuels.

Detonation or "knock" indications have heretofore been most commonly provided by a system employing a "bouncing pin" pick-up, operated by opening and closing contacts. The assignee of this application is now marketing a complete improved system for indicating detonation characteristics, this system being also adapted to other uses, as indicating pressure variations in pumps, or investigating substantially any type of intermittent electrical impulse. The particular pick-up translates pressure variations in the cylinder under test into corresponding electrical variations by varying an air gap in a magnetic circuit. The pick-up will not be described more fully here, as it is the subject of a co-pending application, application Ser. No. 495,610, of Ben R. Kamler and David L. Elam, which issued on March 19, 1946, as Patent No. 2,396,703.

The particular embodiment of this invention which is illustrated in the accompanying drawings is for use in test work on an internal combustion engine, using a one-cylinder engine especially designed for such work and known as a CFR (Consolidated Fuel Research) engine. The detonation or "knock" frequencies which are of particular interest in fuel testing are a function of the cubical content of the cylinder under test, usually ranging between 2,000 cycles per second (in large Diesel engines) and 10,000 or 20,000 cycles per second (in very small high speed engines), the knock frequencies in a CFR engine being very close to 6,500 cycles per second. The invention will be described in connection with the illustrated arrangement; but it will be understood that the entire system, and certain component parts thereof, are useful for other test work.

Referring now more particularly to Figure 1, the particular system illustrated here comprises a pick-up 10 for translating pressure variations in the engine 11 into corresponding electrical variations or impulses. These impulses are then passed through a tuner 12, comprising a tunable filter circuit adapted to pass a band of frequencies at a width sufficient to enable indication of all the detonation frequencies at a particular speed of the test engine, but to eliminate undesired electrical variations. That is, if the test engine is operating at 900 R. P. M., the input to the filter would include the "knock" frequency at around 6,500 cycles per second, the main explosion frequencies at about 15 cycles per second, and other undesired frequencies which might be due to valve knock, or the like. If the fuel detonation frequencies are being studied, the filter 12 would be tuned to about 6,500 cycles per second, and the other undesired frequencies would be eliminated. On the other hand, if one wanted an average indication of the power of the engine, this could be secured by by-passing or disconnecting the filter 12, thereby obtaining an indication of the average value of the main pressure forces in the engine.

The output of the tuner is delivered to amplifying means here indicated as an amplifier 13. The output of this unit is in turn delivered to an integrator 14 comprising a rectifying tube and an integrating circuit averaging the voltage values. The averaged voltage is then delivered to a dump circuit and used to actuate a knock meter 16, which may be a conventional milliammeter with an arbitrary scale. A power supply unit 17 and voltage regulator 18 supply operating voltages and currents for the amplifier 13 and integrator 14; and a completely separate bias control unit 19 provides a variable bias voltage operating on the integrator for purposes to be hereafter more fully described.

Referring now more particularly to Figure 2, an operative embodiment of the system schematically illustrated in Figure 1 will be described. The tuner 12 comprises a condenser 12a in series with two inductances 12b and 12c, the output end of the latter inductance being connected to the signal grid of the first amplifying tube 13a. A point in the connection between the inductances 12b and 12c is connected to ground through the inductance 12d; and the output end of the inductance 12c is connected to ground through a condenser 12e, the condensers 12a and 12e being variable for tuning purposes. In a tuner designed for fuel test work on automobile engines, for example, the condenser elements 12a and 12e may have a maximum capacity of .0018 mfd.; the inductances 12b and 12c a value of .6 h.; and the inductance 12d a value of .045 h. This provides a two-stage tunable filter capable of covering a range of from about 4,500 to about 12,000 cycles per second, and particularly advantageous in that it effects the desired elimination without any loss in the strength of the electrical impulses; in fact, the desired electrical impulses are actually amplified (due to resonance phenomena) in their passage through this particular tunable filter circuit.

The amplifier is shown as comprising two tubes 13a and 13b in cascade, with appropriate associated elements for operative circuit connections. Both amplifying tubes may, for example, be 6J7 tubes. The associated cathode resistors 13c may have a value of 2,000 ohms, and the by-pass condensers 13d a value of 50 mfd. The screen grid resistors 13e may have a value of .5 megohm; and their by-pass condensers 13f a value of .1 mfd. The plate load resistors 13g may have a value of .15 megohm, and the coupling condensers 13h a value of .0015 mfd. The plate voltage supply may include a resistor 13i with a value of 1,500 ohms and a decoupling condenser 13k with a capacity of 10 mfd.

The arrangement just described provides a relatively conventional resistance coupled amplifier. The only additional elements not heretofore described comprise the grid leak resistor 13m, which may have a value of 1 megohm; and the variable volume control arrangement. This arrangement comprises a variable resistance 13n with an additional fixed resistance 13o which may be selectively put in series with the variable resistor or short circuited by a switch 13p. The lower variable resistance may have a maximum value of .5 megohm, and the upper fixed resistance a value of 4.5 megohms. When the switch 13p is closed, the amplifier gain is high; but when this switch is open, the amplifier gain level is relatively low, regulated by the position of the contact arm on the variable resistance, the maximum possible gain when the switch is open being only $\frac{1}{10}$ of that possible when it is closed.

The output of the second amplifying tube 13b is delivered through the coupling condenser 13h to a rectifying tube 14a which may, for example, be a 6H6 with its cathodes and plates connected together, respectively, illustrated as single elements here for simplicity. The cathode of this tube is connected to one end of a load resistor 14b. This resistance develops voltage variations in accordance with the input to the integrator, and has in shunt with it a condenser 14c and a combination of another resistor 14d in series with a condenser 14e. The resistances 14b and 14d may have a value of 5 megohms, for example; and the condensers 14c and 14e a value of 2 mfd. These values are high enough that the first condenser and resistance provide an integrating circuit with a time constant of about 10 seconds, the second condenser adding considerably more time factor to the integrating circuit. In addition, a third condenser 14f (which may also have a capacity of 2 mfd.) is adapted to be cut into the circuit when desired by an on-off switch 14g. All of these condensers and the lower end of the resistance 14b connect to a common point 14h, another load resistance 14i being connected between this point and the same side of the coupling condenser 13h which is connected to the plate element of the rectifying tube 14a.

A variable bias voltage is applied to the point 14h by the bias control means 19. This includes a rectifying tube 19a (which may be another 6H6 with its cathodes and plates connected together, respectively, again illustrated as single elements for simplicity) having its cathode directly connected to one terminal of a standard 60 cycle 115 volt circuit, the plate being connected to the other terminal through a coupling condenser 19b which may have a value of .05 mfd. The rectified output is developed across two series resistances 19c and 19d. The upper or fixed resistor may have a value of 30,000 ohms and the lower variable resistance a value of 50,000 ohms. The lower end of the variable resistance or potentiometer is connected to ground and any desired bias voltage (above ground) is taken off through the movable contact arm, passed through a filter resistance 19e, and connected to the point 14h to give it the desired bias voltage with respect to ground. The condenser 19f of relatively large capacity, as 50 mfd., completes, with the resistance 19e, the filter circuit. The isolation of the point 14h from ground, and the connection of the load resistance 14i (which may have a value of about 500,000 ohms) between this point and the plate of the rectifier tube is particularly important. The normal circuit would have the load resistor 14i connected from plate to ground; but we have found that this provides an inferior circuit as compared with the arrangement shown.

The output of the integrator 14 is delivered to the dump cricuit 15. In particular, the output of the integrator is connected to the grid of a three element tube 15a, which may be a 6F5. The cathode of this tube is connected to ground through a variable resistance 15b and the knock meter 16. Since the maximum space current of a 6F5 is low, the knock meter may be a milliammeter with a maximum deflection of 1.25 milliamperes. Preferably, the scale is divided in an arbitrary manner, as in units from 1 to 100. The variable resistance 15b would, in the present case, have a maximum value of about 5,000 ohms; and this variable resistance operates as a "spreader" to control the amount of deflection of the needle of the meter per unit of electrical input to the tube 15a. No by-pass condenser should be used, as all of the variable currents in the plate circuit should pass through this resistor.

All of the tubes in the system are supplied with operating voltages in relatively conventional manner. The cathodes are heated by a low voltage circuit directly tapped off of a transformer, this circuit not being shown since it is conventional and would confuse the showing of the novel portions of the circuit. Plate voltage is developed in a power supply unit 17, passed through a voltage regulator and filter 18 and delivered to the plate elements of the various tubes having three or more elements. In order to get the best possible voltage regulation, the commercial current is first passed through a voltage regulator unit 20 of conventional type available on the commercial market. The stabilized output of this unit is then delivered (when the switch 17a is closed) to the primary of the transformer 17b, the high voltage secondary of this transformer having its center tap connected to ground and its ends connected to the two plate elements of a rectifying tube 17c, which may be a 5Y3. The rectified output is delivered through a blocking resistor 17d, which may have a value of 3,000 ohms, to the input of a final voltage regulator and filter unit. This unit has two voltage regulating tubes 18a and 18b (which may be type 150 VR tubes) in series, the mid-point being connected to ground through a resistance 18c, which may have a value of .2 megohm. A choke coil 18d is in series with the output; and two condensers 18e and 18f (which may each have a value of 10 mfd.) are connected between the input and output, respectively, and ground.

As representative of one use to which this equipment may be put, the procedure will be described for testing a gasoline of unknown "knock" characteristics (unknown octane number). The operator would first start the CFR engine 11 with a standard fuel of known octane number, a fuel which he believes to be somewhat similar in octane characteristics to that to be tested. He would then close the shorting switch 12f, so that there would be no signal input to the apparatus, turn the spreader rheostat 15b to minimum (0) value, and adjust the bias voltage (through variation of the control of the potentiometer 19d) until the indicating needle of the knock meter 16 stood at zero.

The switch 12f would then be open and the engine compression (or some other factor) adjusted until a knock was heard with the ear. The variable condensers 12a and 12e in the tuner would then be adjusted to give the maximum reading on the knock meter, initial tuning being done with the volume control at maximum gain (switch 13p closed), and final tuning being done with this switch open and the control of the variable volume control resistance 13n at a position keeping the meter needle near the center of the dial. The condensers are not ganged, since it is desirable to be able to make independent adjustments of the condenser 12a with different pickups having different inductive characteristics; but the dials of these condensers are preferably calibrated in frequency to enable an initial adjustment to approximately the correct position. With the tuning completed and set at the proper position, as indicated by response of the knock meter, the spreader rheostat 15b is adjusted to a selected position determined by the engine and fuel under test, the volume control is adjusted to bring the meter needle back to midscale position on the dial, the switch 14g closed to throw in the last condenser 14f in the integrator, and the test engine 11 switched over to the unknown fuel. The knock meter needle will then either go up on the scale (indicating the unknown fuel to be of lower octane rating—more knock—than the known fuel), or go down on the scale (indicating the unknown fuel to have a higher octane rating). The actual octane rating of the fuel is determined from a combination of various characteristics, including the horsepower output of the test engine, but with the other conditions all held constant the knock meter can be calibrated directly in octane rating. Rather, the arbitrary unit on the meter can be related to a chart to directly determine the octane rating under various conditions.

For example, if the standard fuel had an octane rating of 70, and it were known in advance that the unknown fuel had a higher octane rating, the volume control could be adjusted to have the indicator needle stand at full scale (100 units) when the test engine 11 is running on the known fuel. With all of the spreader rheostat resistance 15b in circuit, if switching the test engine 11 over to the unknown fuel causes the meter needle to drop from 100 to 85, the octane rating of the unknown fuel is 72. On the other hand, if the spreader rheostat 15b were adjusted to maximum spread position (all resistance cut out), switching from the known fuel to the unknown fuels (where the known fuel is 70 octane and the unknown is 72 octane) causes the meter needle to drop from 100 to 30.

It will be apparent that the provision of the spreader rheostat 15b, the variable bias voltage control unit 19, and the variable volume control arrangement provide considerable flexibility, taking full advantage of the integrating or averaging ability of the integrator 14. By proper handling of these controls the apparatus may be protected when an unknown fuel is first being investigated; yet very minute differences in detonation characteristics may be examined and will provide a considerable change in the meter reading if the rheostat 15b is set at maximum spread position.

The spreader resistance 15b operates as a self-biasing control, rather than by reason of the addition or subtraction of resistance. The maximum resistance of this element is 5,000 ohms, whereas the plate resistance of the tube 15a would normally be 100,000 ohms or more, so that it would be apparent that a change of a few hundred ohms resistance in the circuit would make no appreciable difference in current flow by reason of the resistance variation as such.

Increasing the resistance of the element 15b, however, causes additional bias voltage to be developed across it (by reason of the flow of plate current therethrough), which adds to the bias voltage delivered by the unit 19 to result in a smaller plate current flow through the meter for a given input voltage from the pick-up 10. That is, the bias voltage provided by the unit 19 determines the initial point of current flow in the tube 15a; while the amount of resistance in circuit with the cathode determines the self-biasing or A. C. biasing effect. The higher the resistance (up to a limiting value) the greater will be the reduction in meter plate current flow per unit of voltage variation in the signal above the initial point set by the other bias means.

This additional bias voltage permits a selection of any meter spread per given single octane number difference in fuel from about eight to about forty divisions on the meter; and this can be done without varying the point of initial setting of the meter needle.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Apparatus of the character described for providing a desired indication of phenomena occurring during the operation of an internal combustion engine from impulses derived from means for translating periodic pressure variations in said engine into corresponding electrical impulses, including: means for amplifying said impulses and eliminating undesired electrical variations; a rectifying tube having at least plate and cathode elements; an integrating circuit comprising a first resistance element and a first condenser element in shunt, the first resistance element being in series in the plate-cathode circuit of said rectifying tube, and a second resistance element and a second condenser element in series with each other and in shunt with the first elements, the impedance of said elements being sufficiently high to provide a time constant many times higher than the time interval between said impulses, whereby the voltage across the second condenser element is a function of an average of said impulses; a tube having at least grid, plate, and cathode elements; means for applying said voltage to the grid of said tube, whereby the space current in the tube is a function of said voltage; indicating means actuated by said space current; and means for varying the response of said indicating means.

2. Apparatus of the character claimed in claim 1, including means for supplying a bias voltage to one of said tubes, this means being variable to enable initial adjustment of the indicating means.

3. Apparatus of the character claimed in claim 1, including power supply means for energizing said amplifying means and tubes, and separate means for supplying a bias voltage to the grid of the last mentioned tube, this means being variable to enable initial adjustment of the indicating means.

4. Apparatus of the character described for providing a desired indication of a variable voltage, including: a tube having at least grid, cathode and plate elements; means for applying said voltage to the grid of said tube, whereby the space current in the tube is a function of the voltage; indicating means actuated as a function of said space current; variable means for applying a bias voltage to one of the two first-mentioned elements of said tube which is independent of the variable voltage and space current; and variable means for applying a bias voltage to one of the two first-mentioned elements of said tube which is a function of said space current.

5. Apparatus of the character claimed in claim 4, wherein the last mentioned means comprises a variable resistor in series with the cathode, the circuit being so arranged that all variable currents in the plate circuit pass through this resistor.

6. Apparatus of the character described for indicating the average amplitude of a plurality of electrical impulses, including: means for amplifying said impulses; a rectifying tube having at least plate and cathode elements; an integrating circuit comprising a first resistance element and a first condenser element in shunt, the first resistance element being in series in the plate-cathode circuit of said rectifying tube, and a second resistance element and a second condenser element in series with each other and in shunt with the first elements, the impedance of said elements being sufficiently high to provide a time constant many times higher than the time interval between said impulses, whereby the voltage across the second condenser element is a function of an average of said impulses; a tube having at least grid, plate, and cathode elements; means for applying said voltage to the grid of said tube, whereby the space current in the tube is a function of said voltage; indicating means actuated by said space current; and means for supplying a bias voltage to the end of the first resistance furthest from the cathode element of the rectifying tube, a connection from the amplifying means being made to the plate element of the rectifying tube and a return connection to said amplifying means being made through said shunt elements and through the bias means.

7. Apparatus of the character described for indicating the average amplitude of a plurality of electrical impulses, including: means for amplifying said impulses; a rectifying tube having at least plate and cathode elements; an integrating circuit comprising a first resistance element and a first condenser element in shunt, the first resistance element being in series in the plate-cathode circuit of said rectifying tube, and a second resistance element and a second condenser element in series with each other and in shunt with the first elements, the impedance of said elements being sufficiently high to provide a time constant many times higher than the time interval between said impulses, whereby the voltage across the second condenser element is a function of an average of said impulses; a third resistance element connected between the plate element of the rectifying tube and the end of the first resistance element furthest from the cathode element thereof, the connection from the amplifying means being made to a point between the plate element of the rectifying tube and the adjacent end of the third resistance element; a tube having at least grid, plate, and cathode elements; means for applying said voltage to the grid of said tube, whereby the space current in the tube is a function of said voltage; and indicating means actuated by said space current.

ALFRED CROSSLEY.
D. L. ELAM.

REFERENCES CITED

The following references are of record in the file of this patent:

UNITED STATES PATENTS

| Number | Name | Date |
|---|---|---|
| 2,202,900 | Draper | June 4, 1940 |
| 2,291,045 | Lancor | July 28, 1942 |
| 1,611,932 | Mathes | Dec. 28, 1926 |
| 1,919,948 | Jones | July 25, 1933 |
| 2,222,172 | Dimmick | Nov. 19, 1940 |
| 2,039,267 | Barber | Apr. 28, 1936 |
| 1,917,728 | Miessner | July 11, 1933 |
| 2,251,973 | Beale et al. | Aug. 12, 1941 |
| 2,296,092 | Crosby | Sept. 15, 1942 |
| 2,300,115 | Grundmann | Oct. 27, 1942 |
| 2,014,102 | Conklin | Sept. 10, 1935 |
| 2,309,560 | Welty | Jan. 26, 1943 |
| 2,218,642 | Hathaway | Oct. 22, 1940 |
| 1,907,415 | Carpenter et al. | May 2, 1933 |
| 2,366,076 | Wilbur | Dec. 26, 1944 |
| 2,227,906 | Kellogg | Jan. 7, 1941 |
| 2,280,740 | Belar | Apr. 21, 1942 |
| 2,086,965 | Shepard | July 13, 1937 |
| 2,340,714 | Traver et al. | Feb. 1, 1944 |
| 2,275,675 | Draper et al. | Mar. 10, 1942 |

FOREIGN PATENTS

| Number | Country | Date |
|---|---|---|
| 504,509 | British | Apr. 29, 1939 |

OTHER REFERENCES

"The Standard-Sunbury Engine Indicator," by Beale and Stansfield, published in "The Engineer," Dec. 27, 1935, pages 667–669. (Copy in 177–351.11.)